United States Patent [19]

Hashimoto

[11] Patent Number: 4,494,703
[45] Date of Patent: Jan. 22, 1985

[54] ENDLESS TAPE CASSETTE

[75] Inventor: Kazuo Hashimoto, Tokyo, Japan

[73] Assignee: Hashimoto Corporation, Tokyo, Japan

[21] Appl. No.: 370,645

[22] Filed: Apr. 21, 1982

[30] Foreign Application Priority Data

May 13, 1981 [JP] Japan ................................. 56-72063

[51] Int. Cl.³ ............................................ G11B 23/06
[52] U.S. Cl. .................................. 242/55.19 A; 360/93
[58] Field of Search ................ 242/55.19 A, 55.19 R; 360/93, 94

[56] References Cited

U.S. PATENT DOCUMENTS

| 3,442,462 | 5/1969 | Cole, Jr. | 242/55.19 A |
| 3,448,490 | 9/1969 | Knox | 242/55.19 A |
| 3,706,422 | 12/1972 | Ito et al. | 242/55.19 A |
| 3,708,135 | 1/1973 | Lace | 242/55.19 A |
| 3,894,699 | 7/1975 | Bara | 242/55.19 A |
| 3,971,523 | 7/1976 | Ishii | 242/55.19 A |
| 3,974,975 | 8/1976 | Holmes | 242/55.19 A |
| 4,015,790 | 4/1977 | Gelardi et al. | 242/55.19 A |

FOREIGN PATENT DOCUMENTS 5349417 5/1978 Japan.

Primary Examiner—Billy S. Taylor
Attorney, Agent, or Firm—James C. Wray

[57] ABSTRACT

A magnetic endless tape is made with a half of a normal tape width to avoid the tape housed in the housing from being pressed with unreasonable force; and a reel is provided with flanges as its upper and lower sides and a tape rolling-up wall of the reel is inclined to a V shape with respect to the upper-side flange, thereby making the reverse of the tape possible so that a portion of the tape may be rewound when the cassette is inverted without trapping the rewound portion between the normally upper flange and the layers of tape wound on the reel.

3 Claims, 8 Drawing Figures

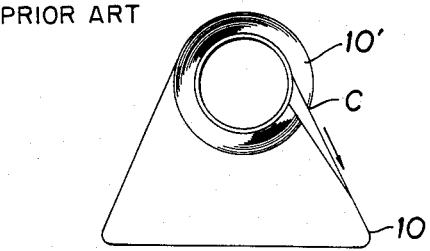
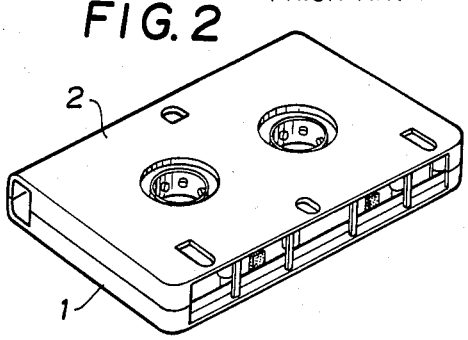
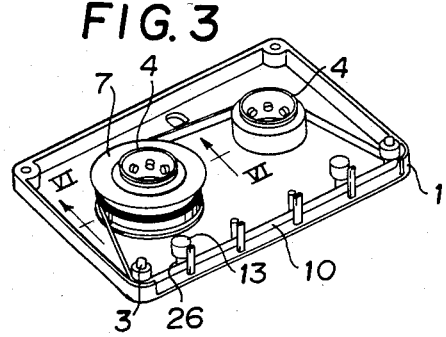
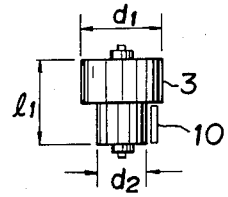
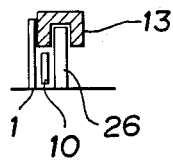

ENDLESS TAPE CASSETTE

BACKGROUND OF THE INVENTION

The present invention relates to a magnetic endless tape cassette and more particularly to an improvement of the magnetic tape cassette according to JAPAN A No. 53-49417, published on May 4, 1978.

Conventionally, there have been known various kinds of constitutions that a magnetic endless tape is housed within a cassette-type housing which houses an open reel tape therein. In the conventional magnetic endless tape, a magnetic tape having the same width as a standard magnetic tape is endlessly formed in a space within a housing in which the standard tape is housed in an open reel shape. Under the construction, it was so arranged that respective horizontal faces of the outlet and the inlet through which the tape passes were made to be different from geometrical view-points, in order to make the tape run in the endless form by connecting its initial end and terminal end. Alternatively, some devices made the outlet and inlet cross each other. Theoretically, in such cases, the whole height of the tape-crossing portion was required to be twice the height of the tape. However, since the tape itself is soft, the tape was housed within the housing in a state that the tape was forcedly pressed by an upper housing, or the tape was forcedly bent so as to be housed within the housing. Therefore, the unreasonable force and the like was given to the tape from the beginning, which resulted in the biggest cause that the endless tape was not driven smoothly. JAPAN A No. 53-49417 has generated new benefits caused by using a tape housed within a housing at half width of a tape used in a normal cassette.

SUMMARY OF THE INVENTION

Accordingly, the present invention has for its object to provide a novel endless tape cassette which solves the abovesaid defects of the conventional tape cassette.

Another object of the present invention is to provide a magnetic endless tape cassette which makes possible the reversal of the tape, which has been considered to be impossible in the conventional endless tape cassettes.

Still another object of the present invention is to provide an endless tape to be held on a reel by means of upper and lower flanges provided on the reel.

Another object of the invention is to provide a housing, a reel, and an endless tape partially wound thereon in which tape can be withdrawn from a center of a reel without loosening tape wound on the reel.

Another object of the invention is the provision of a housing reel and endless tape combination with a tape of one-half a width of a standard tape in which the housing, reel and tape may be inverted and in which the tape and reel may be run in a reverse direction without loosening the wound tape from the reel.

BRIEF EXPLANATION OF THE DRAWINGS

FIG. 1 is a perspective view of a conventional endless tape within a cassette.

FIG. 2 is a perspective view of a conventional cassette tape (microcassette).

FIG. 3 is a perspective view showing the content of an endless cassette tape according to the present invention.

FIG. 4 is an enlarged view of a guide roller shown in FIG. 3.

FIG. 5 is an enlarged cross-section view of a tape-passing portion shown in FIG. 3.

DETAILED DESCRIPTION OF THE INVENTION

Figure 6:
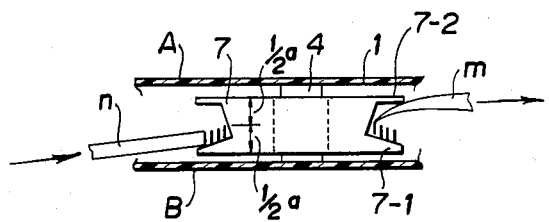
FIG. 6 is an enlarged cross-section view taken along the line VI—VI of FIG. 3.

In JAPAN A No. 53-49417 invented by the same inventor of the present invention, its structure was decided on the basis of new effects generated due to the fact that a tape housed within a housing uses a half width of a standard tape in a normal cassette. The present invention further improves such a structure that the reversal of an endless tape which has been considered to be impossible so far is made possible.

In the conventional endless tapes if one round of the tape takes, for example, three minutes and there is one part which is missed listening to during the reproduction, it would not be possible to reverse the already passes portion of the tape, even if the tape were instantly stopped. There has been no way to listen to said missed portion of the tape except by turning the tape in the normal direction, i.e., turning the tape for three minutes.

That is convenient, however, in the present invention. The cassette inclusive of the tape is taken out of a tape recorder at that time: the top and bottom faces of the tape are inverted, and the cassette with the tape is again inserted into the tape recorder to drive the tape so that the tape can be reversed at least for a few seconds: then the tape is stopped and the cassette with the tape is taken out from the tape recorder. The cassette with the A face of the tape being on the upperside, is inserted in the tape recorder in the normal way, whereby the normal reproduction is made possible from a position which is prior to the firstly stopped portion of the tape.

The following is the explanation of the structure and effects of the endless tape cassette according to the present invention. In this connection, the basic structure is the same as that of the JAPAN A No. 53-49417, so that the basic structure of said Publication and improved structure of the present invention are described as follows:

FIG. 1 shows the structure of the conventional endless tape. At the portion C, the outlet portion of the tape from a tape roll 10' the wound layer portions of tape were crossed. Portion C should have been theoretically required to be twice the height or the width of the tape. However, the tape was so slanted that the tape was pressed and housed into a case having the same height as the tape, and the tape was run by great driving force under tension so as to overcome frictional force. Within the cassette 1 having an upper half 2 of the shape and of the outer appearance, as shown in FIG. 2, the present invention uses a tape of one-half (½) conventional width within the same size housing, as shown in FIG. 3. The half size tape is wound on a reel 7. Reel 7 has twice the height of the narrow tape and is coaxially and rotatably provided on the outer circumference of the reel hub 4. A tape is wound on the special reel 7 to form an endless tape 10. Under the above-mentioned constitution, even if parts of the tape are crossed at the outlet portion and inlet portion and the height of the tape effectively becomes doubled at said portions at the worst, such a height is within the range of the height which is sufficiently housed in the normal housing, so that there is no risk that the tape may be contacted and rubbed by the inner face of an upper cassette half 2.

FIG. 4 is an enlarged view of a guide roller 3. The diameter of the lower half portion of the guide roller 3 is made smaller than that of the upper half portion of the guide roller 3. The endless tape 10 is arranged to run along said lower half portion of the guide roller 3. Next, FIG. 5 shows a principal part of a path through which the tape passes. Usually, in conventional cassettes, a tape is passed through the space between guide pin 26 and housing 1 as illustrated in the drawing. A cap 13, as shown in FIG. 5, on the top of the guide pin 26 makes the tape 10 pass by only the lower half portion of the guide pin 26 and prevents the tape 10 from invading the upper half portion of the guide pin 26. The tape 10 can smoothly run along the lower half portion of the conventional path in cooperation with the above-mentioned guide roller 3. Therefore, the endless tape is set in a cassette having standard cassette halves or cassette halves for a microcassette and is used only tape recorders which have gaps of heads at lower half portions. Fortunately, however, cassette tape recorders and microcassette tape recorders in which the lower half of the head forms a gap are the standard type of recorders. Therefore, the structure according to the present invention can be used without any hindrance in utility. Incidentally, that is the same with the conventional endless tape which can not normally be used when the cassette is turned.

The endless tape cassette envisioned herein is designed primarily to be played in tape playing machines having two take-up spindles, though the design may be adapted for use in other types of players.

FIG. 6 shows a cross section view taken along the line VI—VI of FIG. 3. Housing 1 mounts reel 7 having a hub part 4 and lower and upper radially extending flange portions 7-1, 7-2. A tape-wound wall of the reel axis is inclined in a V shape with respect to the A face. The m part of the tape is let out from the innermost layer of the endless tape portion wound on the reel, and the n part is wound around the outer layer of the endless tape on the reel. The wound portion becomes several tens of layers if one circle of the endless tape takes, for example, several tens of seconds. For convenience in the drawings, the layers of the tape are schematically represented by four parallel lines. The wound portion forms wound layers in good order from the outermost layer to the innermost layer. The lower flange portion 7-1 is so formed that its thickness gradually increases from the outer circumference towards the inner circumference whereby the m part of the tape can be readily pulled out of the innermost wound layer portion. As mentioned above, FIG. 6 shows a state of the tape with the A face of the cassette at the top position.

Figure 7:
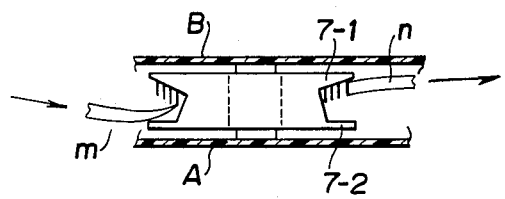
FIG. 7a is an enlarged cross-section view showing that upper and lower sides of a reel and a housing in FIG. 6 are reversed.
FIG. 7b is an enlarged cross-section view showing a state in which the tape of FIG. 7a runs.
Figure 7:
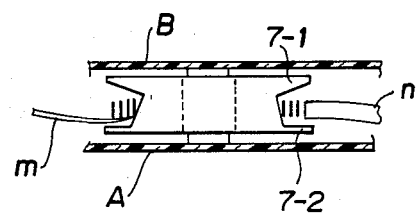

FIGS. 7a and FIG. 7b show schematic views of the wound layer portion with the cassette A face positioned at the bottom and the B face positioned at the top. In FIG. 7a, although the m part and the n part are arranged as shown in the drawing, the wound layer portions do not drop downwardly if the A and B faces of the cassette are merely turned over, since the wound layer portions are not loosened. However, when the tape is driven as it is press-contacted by a capstan and a pinch roller, the tape drops downwardly aginst the above-mentioned inclining wall. The layers gradually shift as shown in FIG. 7b due to the generation of looseness therebetween. And finally, said dropped wound layers press on the m part of the tape. Primarily, the normal endless tape is formed by a tape of a width a, so that m part is pressed between the inner face of the upper half of a cassette and a wound layer portion from the beginning until the m part is twisted to an almost flat angle. Such a space as shown by "$\frac{1}{2}a + \frac{1}{2}a$" in FIG. 6 according to the present invention can not be occupied. When the wound layer portion is further extremely press-contacted and the m part is further squeezed unreasonable force may be required to drive the tape. So much force may be required that the tape cannot be driven by the capstan and the pinch roller. However, it takes a fairly long time until the above-mentioned state is realized. These kinds of the endless tapes are limited to about three minutes per round. It is enough to reverse the tape for a half round at the maximum, to listen again to a portion of the tape which was missed during reproduction of a recorded sound. Therefore, there is no need to rewind the tape more than half of one round. The reason is that if there is need to rewind the tape more than half of a round, it is better to merely rotate the tape in the normal direction without reversing the tape, so that the missed portion can be reproduced again. Accordingly, utility is limited in a case such as the above-mentioned to 10% of one round of which takes three minutes. It is enough in practice to reverse the tape for about 20 seconds. As apparent from the above explanation, the present invention makes the way to reverse the tape possible.

When the cassette is inverted for reversing the tape, the wound tape convolutions are held upward by engaging with the center. The portion of the tape being fed from the center of the tape pack is pushed against the center of the reel. The capstan drives the tape, pulling the tape from the outer convolution and thus turning the reel. As the reel turns with the center feed point of the tape held in position and with the wound tape convolutions held upward, the reel takes up tape beneath the wound convolutions and between the upward-held convolutions and the flat flange 7-2, which is now in the lower position. To replay that portion of the tape which has been taken up on the reel during reversing, the cassette is inverted to its proper position. The capstan then draws that rewound portion of the tape from between the wound convolutions and the flat flange 7-2, which is now in the upper position.

As mentioned above, the present invention can form an endless tape taking several minutes for one round even in a case of a very small microcassette by changing the width of a standard tape used in the conventional endless tape to a one-half ($\frac{1}{2}$) width thereof. For housing an endless tape in a microcassette, there have been few prior-art examples. Those examples could not be constituted by a wound layer portion of a tape having a length of several minutes wound on a reel with an outlet portion m of the tape provided by transversing said wound-layer portion. Microcassette endless tapes merely have been threaded directly in one round which takes only several seconds. The present invention provides upper and lower flanges on a reel with a V-shaped hub and upward and inward sloping inner face of the lower flange. Therefore, when there is a missed portion during the reproduction of a recorded sound, the tape can be reversed by immediately stopping the tape and inserting the reel upside down to reverse the tape, and then the missed portion can be reproduced by re-setting the tape to the original position. Under the above constitution, the present invention can greatly heighten the utility in those kinds of cassettes.

What is claimed is:

1. An endless tape cassette comprising:
an endless magnetic tape having a width "178 a" which is one half as wide as standard cassette tape,
a tape reel having a height of at least about "a", the tape reel having upper and lower radially extending flange portions and a hub portion concentric with the reel,
cassette halves of a housing which are symmetric at upper and lower sides and have, respectively, a depth of the more than "½a" at their inner height, so as to house the reel and the endless tape therein,
a tape guide means for guiding the endless tape in the housing, guiding an inside layer of the tape rolled on the reel to an opening forward in the housing assembled by the upper and lower cassette halves and then introducing the tape to the outside of the reel so as to roll the endless tape in layers on the reel,
means for restricting the running of the tape which restricts the tape of the above-mentioned width "½a" to properly and horizontally run the tape only on the lower cassette half without invading into the upper cassette half at the opening in the housing when the tape is guided,
the hub portion being mounted within the housing such that when the endless tape cassette is inserted into a tape recorder, the central bore of the hub portion engages with a spindle for turning the tape reel in the tape recorder, and
means provided in the cassette housing to allow access of a capstan and pinch roller for driving the endless tape in a normal direction,
wherein, in a case that a portion of the tape has passed during reproduction slightly before that portion is wished to be reproduced, by inverting the cassette in which said tape is incorporated, and inserting the cassette again into a tape recorder, and then driving the tape within the cassette, the tape is driven, drawing the tape from an outer layer on the reel and winding tape on the reel between the wound layers and the normally upper flange for a fairly long time before the normally wound layers are loosened.

2. An endless tape cassette comprising a housing having upper and lower halves, a magnetic tape having a width one half of a width of a conventional magnetic tape within a tape cassette, the magnetic tape being coiled and having ends joined in the form of an endless magnetic tape, a tape reel having a height of a conventional tape reel mounted within the halves of the endless tape cassette and having disposed thereon coils of the magnetic tape, the tape reel having a hub portion and having upper and lower flanges, the lower flange having an upper surface sloping upwardly from an outer periphery of the lower flange toward the hub, and interior surface of the reel sloping outwardly from an inner periphery of the lower flange to an inner surface of the upper flange, and the upper flange having a substantially flat inner surface, tape guiding means mounted in the housing for guiding the magnetic tape in the housing and for guiding tape from an inner coil on the reel to an opening forward in the cassette housing and then redirecting the tape to the outside of the reel for winding the tape on the coils on the reel, the tape guide means including restricting means for restricting the tape for running in the lower housing half, opening means in a forward portion of the housing for receiving a capstan and pinch roller to drive the tape within the housing, the housing having drive shaft opening means adjacent the hub and the hub having a central opening for receiving a drive shaft to rotate the reel within the housing, whereby the tape is withdrawn from an innermost coil adjacent the hub of the reel and is driven through a lower half of the housing and is wound on coils on the lower portion of the reel adjacent to the lower flange, and whereby the cassette housing may be inverted for moving the tape through the cassette in reverse direction by the capstan and pinch roller, the tape being drawn from an outer coil on the reel, turning the reel and winding tape from the capstan on the reel adjacent a flat inner surface of the upper flange, which is in a lower position during inversion of the cassette.

3. An endless tape cassette as claimed in claim 1 wherein the cassette further comprises two hub portions for receiving take-up spindles of a tape player.

* * * * *

UNITED STATES PATENT OFFICE
CERTIFICATE OF CORRECTION

Patent No. 4,494,703            Dated Jan. 22, 1985

Inventor(s) KAZUO HASHIMOTO

It is certified that error appears in the above-identified patent and that said Letters Patent are hereby corrected as shown below:

Column 5, line 6, change "178 a" to --"1/2a"--.

Signed and Sealed this

Twenty-fifth Day of June 1985

[SEAL]

Attest:

DONALD J. QUIGG

Attesting Officer      Acting Commissioner of Patents and Trademarks